(12) United States Patent
Acharya et al.

(10) Patent No.: US 9,392,591 B2
(45) Date of Patent: Jul. 12, 2016

(54) METHOD FOR SYNCHRONIZATION AND SIGNALING OF OCCUPIED BANDS IN ORTHOGONAL FREQUENCY DIVISION MULTIPLEXING (OFDM) TRANSMISSIONS

(75) Inventors: Joydeep Acharya, Sunnyvale, CA (US); Sivarama Venkatesan, Milltown, NJ (US); Harish Viswanathan, Morristown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 916 days.

(21) Appl. No.: 12/466,533

(22) Filed: May 15, 2009

(65) Prior Publication Data
US 2010/0290409 A1    Nov. 18, 2010

(51) Int. Cl.
| | | |
|---|---|---|
| *H04W 72/12* | (2009.01) | |
| *H04W 72/04* | (2009.01) | |
| *H04L 5/00* | (2006.01) | |
| *H04L 27/26* | (2006.01) | |
| *H04W 16/14* | (2009.01) | |
| *H04W 84/04* | (2009.01) | |

(52) U.S. Cl.
CPC .......... *H04W 72/042* (2013.01); *H04L 5/0094* (2013.01); *H04L 27/2655* (2013.01); *H04L 27/2676* (2013.01); *H04W 16/14* (2013.01); *H04W 72/0453* (2013.01); *H04W 84/045* (2013.01)

(58) Field of Classification Search
CPC .............. H04L 5/0094; H04L 27/2655; H04L 27/2676
USPC .......................................... 370/329, 328, 260
See application file for complete search history.

(56) References Cited

U.S. PATENT DOCUMENTS

| | | | |
|---|---|---|---|
| 2009/0060075 A1* | 3/2009 | Mohebbi ..................... 375/260 |
| 2009/0135761 A1* | 5/2009 | Khandekar et al. ........... 370/328 |
| 2009/0264142 A1* | 10/2009 | Sankar et al. ................. 455/501 |
| 2010/0208834 A1* | 8/2010 | Van Zelst et al. ............. 375/267 |

\* cited by examiner

*Primary Examiner* — Donald Mills
*Assistant Examiner* — Henry Baron
(74) *Attorney, Agent, or Firm* — Davidson Sheehan LLP

(57) ABSTRACT

The present invention provides a method for use in a wireless communication system that supports orthogonal frequency division multiplexing (OFDM) of transmissions over a plurality of subcarriers. One embodiment of the method includes a network entity that allocates one or more of a plurality of sub-bands for communication with an access terminal. Each of the sub-bands includes one or more of the subcarriers and is associated with a corresponding a pseudo-random sequences. The network entity can also transmit one or more of the plurality of pseudo-random sequences over an air interface. The transmitted pseudo-random sequence indicate the sub-bands that are allocated for communication with the access terminal.

20 Claims, 4 Drawing Sheets

METHOD FOR SYNCHRONIZATION AND SIGNALING OF OCCUPIED BANDS IN ORTHOGONAL FREQUENCY DIVISION MULTIPLEXING (OFDM) TRANSMISSIONS

BACKGROUND OF THE INVENTION

1. Field of the Invention

This invention relates generally to communication systems, and, more particularly, to wireless communication systems.

2. Description of the Related Art

Conventional wireless communication systems include a network of base stations, base station routers, and/or other wireless access points that are used to provide wireless connectivity to access terminals in geographic areas (or cells) associated with the network. Information may be communicated between the network and the access terminals over an air interface using wireless communication links that typically include multiple channels. The channels include forward link (or downlink) channels that carry signals from the base stations to the access terminals and reverse link (or uplink) channels that carry signals from the access terminals to the base station. The channels may be defined using time slots, frequencies, scrambling codes or sequences, or any combination thereof. For example, the channels in a Code Division Multiple Access (CDMA) system are defined by modulating signals transmitted on the channels using orthogonal codes or sequences. For another example, the channels in an Orthogonal Frequency Division Multiplexing (OFDM) system are defined using a set of orthogonal frequencies known as tones or subcarriers.

Next (4th) generation wireless systems such as 802.16e WiMAX, UMTS Long Term Evolution (LTE) and cdma2000 EV-DO Revision C Ultra Mobile Broadband (UMB) are based on Orthogonal Frequency Division Multiplexing (OFDM). In OFDM, the transmitted signal consists of narrowband tones (or sub-carriers) that are nearly orthogonal to each other in the frequency domain. A group of tones transmitted over the duration of one time slot (or frame) constitutes the smallest scheduling resource unit, also known as a tile, a resource block (RB), or a base node (BN). Different tones belonging to a tile may be scattered across the entire carrier frequency band used by the OFDM system so that each tile transmission experiences diversified channels and interference on each sub-carrier. Alternatively, a tile can be formed of a contiguous set of tones so that the channel and interference experienced by the tile are more localized.

Conventional wireless systems are based on a static allocation of the spectrum used for wireless communications. For example, a first portion of the spectrum can be pre-allocated or licensed to a first communication system to support wireless communication with access terminals that are registered with the first communication system. A second portion of the spectrum could then be allocated to a second communication system. Alternatively, the second portion of the spectrum could be used for unlicensed communications over the air interface. If the wireless system supports OFDM communication then the first and second portions of the spectrum may include tones, subcarriers, and/or sub-bands of the total bandwidth allocated for OFDM communication. Alternatively, if the wireless system supports other types of communication that allocate the bandwidth of the available spectrum in different ways, e.g., using different sets of frequencies, then the spectrum may be partitioned into first and/or second portions in other ways.

Static allocation of the available spectrum is used in conventional wireless communication at least in part because it is comparatively simple to implement. However, static allocation may lead to inefficient use of the spectrum resources. For example, the spectrum allocated to the first communication system for unlicensed communications may be underutilized, e.g., due to a small number of subscribers. At the same time, the spectrum allocated to the second communication system and/or unlicensed communications may be over utilized if a large number of access terminals are attempting to access the second communication system and/or use the unlicensed communication bands. This may lead to lowered quality of service, dropped calls, denial of access requests, and other undesirable effects.

Spectrum flexibility is therefore expected to become an important characteristic of future wireless communication systems. Spectrum flexibility is achieved in an OFDM system by dynamically nulling out sub-carriers in the bands occupied by other communication systems. For example, different OFDM communication systems may utilize different sub-bands depending on the current or expected resource requirements for each system. Future OFDM-based communication systems are also likely to employ a noncontiguous OFDM transmission technique in which the sub-carriers that are actually used by the system are not necessarily contiguous and could be scattered over a large bandwidth for spectrum flexibility. Such a scheme retains the spectral efficiency advantages of OFDM by minimizing guard-bands while providing the possibility for dynamic spectrum occupancy.

Two fundamental problems need to be addressed to implement spectrum flexibility in OFDM systems. First, the communication system has to provide a way for the receiver to synchronize to the symbols transmitted over the air interface, i.e., by identifying the sample that corresponds to the start of an OFDM symbol. Second, the communication system has to tell the receiver which sub-bands are actually being used by the system for communication over the air interface. One conventional solution is to implement a separate signaling channel that carries signals that indicate the bandwidth over which the traffic signal is transmitted. This solution requires that a portion of the bandwidth be reserved for the control signal and the receiver needs to monitor this out-of-band control signal continually. Current OFDM symbol synchronization techniques rely on the use of a cyclic prefix or a time-domain preamble signal that is transmitted over a contiguous band that is a priori known to the receiver. Thus, conventional symbol synchronization techniques are not applicable to noncontiguous OFDM signaling.

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for use in a wireless communication system that supports orthogonal frequency division multiplexing (OFDM) of transmissions over a plurality of subcarriers. One embodiment of the method includes a network entity that allocates one or more of a plurality of sub-bands for communication with an access terminal. Each of the sub-bands includes one or more of the subcarriers and is associated with a corresponding pseudo-random sequence. The network entity can also transmit one or more of the plurality of pseudo-random sequences over an air interface. The transmitted pseudo-random sequences indicate the sub-bands that are allocated for communication with the access terminal.

In another embodiment, a method is provided for use in a wireless communication system that supports orthogonal frequency division multiplexing (OFDM) of transmissions over a plurality of subcarriers. The method includes receiving a signal including one or more pseudo-random sequences, at an access terminal over an air interface with an access point. The pseudo-random sequence(s) indicates corresponding sub-bands that include one or more subcarriers. The method also includes detecting the pseudo-random sequence(s) included in the received signal and synchronizing the access terminal to the access point using the pseudo-random sequence(s) included in the received signal.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
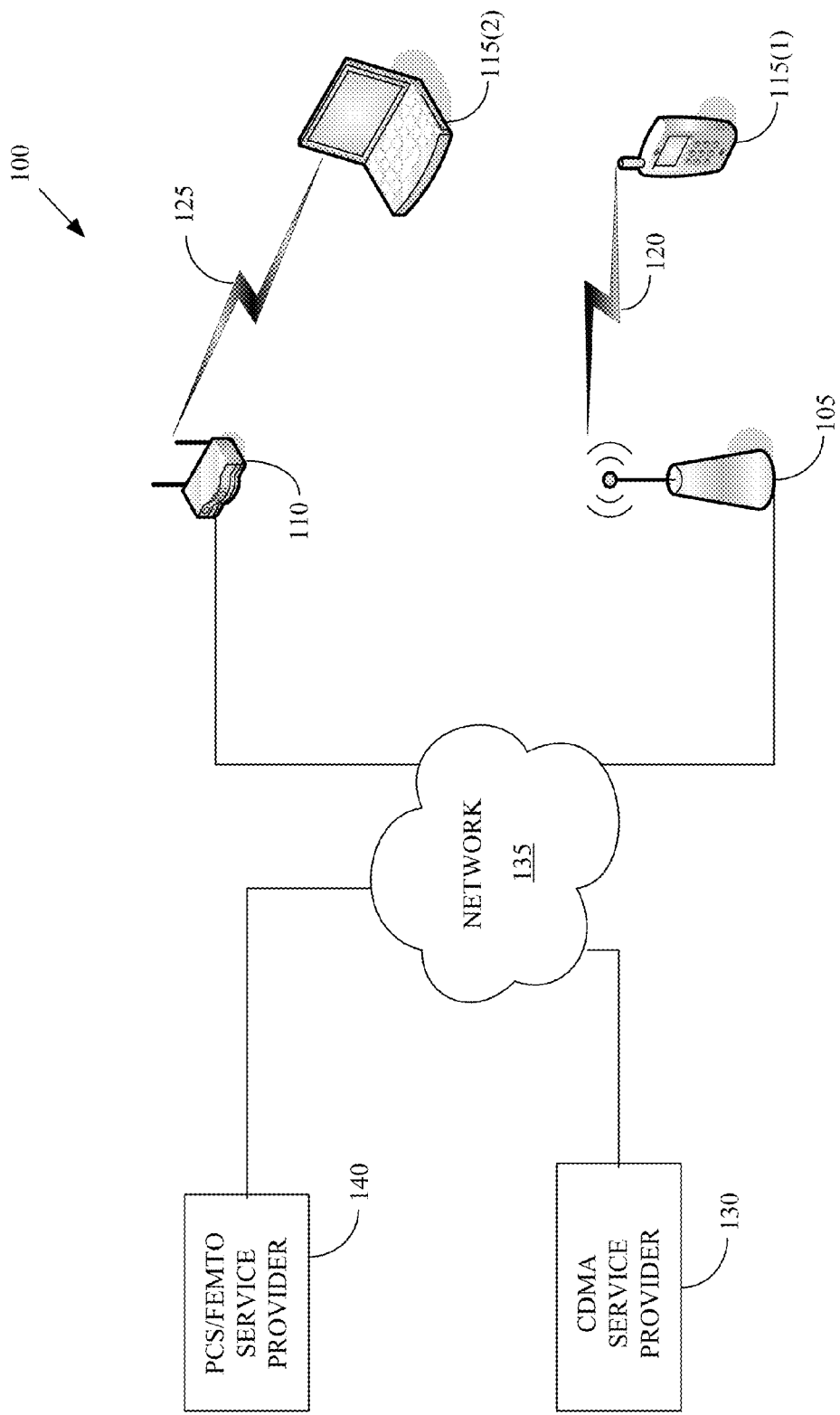
FIG. 1 conceptually illustrates one exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 includes one or more base stations 105 and/or femtocells 110 that are used to provide wireless connectivity to one or more access terminals 115(1-2) over corresponding air interfaces 120, 125. The distinguishing indices (1-2) may be used to indicate individual access terminals or subsets of the access terminals. However, these indices may be dropped when referring to the access terminals 115 collectively. This convention may also be used for other elements shown in the drawings. The access terminals 115 may include mobile units and/or fixed or relatively immobile terminals that are configured for wireless communication with the base stations 105 and/or the femtocell 110. The access terminals 115 may also be referred to using other terms or phrases including subscriber stations, subscriber terminals, mobile terminals, and the like.

The wireless communication system 100 may provide wireless connectivity according to the standards and/or protocols defined for next (4th) generation wireless systems such as 802.16e WiMAX, UMTS Long Term Evolution (LTE) and cdma2000 EV-DO Revision C Ultra Mobile Broadband (UMB), which are based on Orthogonal Frequency Division Multiplexing (OFDM) techniques that may implement Hybrid Automatic Repeat reQuest (HARQ) to increase the capacity of the OFDM system. Techniques for implementing and/or operating systems that provide wireless connectivity according to next generation wireless standards and/or protocols are known in the art, and in the interest of clarity only those aspects of implementing and/or operating the systems that are relevant to the present invention will be discussed herein. Furthermore, persons of ordinary skill in the art having benefit of the present disclosure should appreciate that the present invention is not limited to next generation wireless communication systems and/or systems that implement OFDM. In alternative embodiments, the wireless communication system 100 may be any generation system that operates according to other standards and/or protocols.

In the illustrated embodiment, the base station 105 communicates with a CDMA service provider 130 through a network 135. The CDMA service provider 130 provides functional support for cellular wireless communication between the base station 105 and access terminal 115(1) over the air interface 120 using OFDM. For example, the CDMA service provider 130 may be licensed to use subcarriers and/or sub-bands of subcarriers within the OFDM spectrum for communication over the air interface 120. In the illustrated embodiment, the femtocell 110 communicates with a PCS/femtocell service provider 140 through the network 135. The PCS/femtocell service provider 140 provides functional support for wireless communication between the femtocell 110 and access terminal 115(2) over the air interface 125. For example, the PCS/femtocell service provider 140 may be licensed to use subcarriers and/or sub-bands of subcarriers within the OFDM spectrum for communication over the air interface 125. Although FIG. 1 depicts base stations 105 and femtocells 110 that are configured for licensed communication over the air interfaces 120, 125, persons of ordinary skill in the art having benefit of the present disclosure should appreciate that the wireless communication system 100 may also support unlicensed wireless communication, e.g., in the Industrial, Scientific, and Medical (ISM) bands.

The base station 105 can provide wireless connectivity to a geographic area (or cell) and the femtocell 110 can provide wireless connectivity to another (possibly overlapping) geographic area. The diameter of the cell served by the base station 105 may be as much as several kilometers. The diameter of the cell served by the base station 105 is typically much larger than the diameter of the geographic area served by the femtocell 110, which is typically on the order of several meters. Although not shown in FIG. 1, the wireless communication system 100 may also include other types of access points or access networks that provide wireless connectivity to other geographic areas. For example, the wireless communication system 100 may also include access points that provide wireless connectivity to micro-cells. However, persons of ordinary skill in the art having benefit of the present disclosure should appreciate that the relative sizes of the geographic areas served by the base station 105, the femtocell 110, and/or any other types of access points are not material to the present invention.

The geographic areas served by the base station 105 and the femtocell 110 may be proximate to each other and/or overlap. Wireless transmissions involving the base stations 105 and the femtocell 110 may therefore interfere with each other, e.g., if they are transmitted using the same subcarriers and/or sub-bands. Consequently, different sub-bands may be allocated to the base station 105 and the femtocell 110 to reduce or mitigate interference between wireless communications involving the base station 105 and the femtocell 110.

Figure 2:
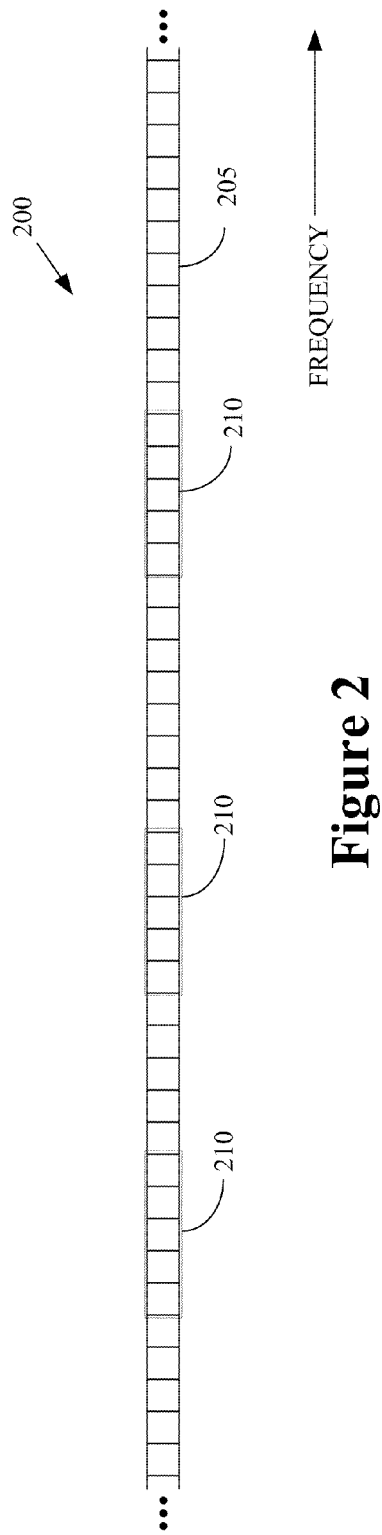
FIG. 2 conceptually illustrates one exemplary embodiment of an OFDM spectrum of subcarriers.

FIG. 2 conceptually illustrates one exemplary embodiment of an OFDM spectrum 200 of subcarriers 205 (only one indicated by a numeral in FIG. 2). Frequency increases to the right in FIG. 2. In the illustrated embodiment, each of the subcarriers 205 corresponds to a particular portion of the bandwidth allocated to the OFDM spectrum 200. For example, each of the subcarriers 205 may be a 1.25 MHz channel of the OFDM spectrum 200. The total number of subcarriers 205 in the OFDM spectrum 200 is a matter of design choice and typically varies between 64 and 2048. However, persons of ordinary skill in the art having benefit of the present disclosure should appreciate that this range is intended to be exemplary and not to limit the number or bandwidth of subcarriers 205 that can be present in the OFDM spectrum 200. In various alternative embodiments, the subcarriers 205 in the sub-bands 210 may be contiguous or non-contiguous. Similarly, the sub-bands 210 may be contiguous or non-contiguous.

In the illustrated embodiment, sub-bands 210 are allocated to one or more femtocells (such as the femtocell 110 shown in FIG. 1) for communication over the air interface. The remaining subcarriers 205 can be reserved for (or allocated to) other systems including a CDMA communication system that supports wireless communication using one or more base stations (such as the base stations 105 shown in FIG. 1). Alternatively, one or more of the remaining subcarriers 205 can be used by other types of communication systems that have licensed the subcarriers 205 or for unlicensed communication. In one embodiment, the allocation of the sub-bands 210 to the femtocells can be performed when the femtocells are deployed and/or configured for communication. Alternatively, the allocation of the sub-bands 210 can be dynamically configured or reconfigured after the femtocells have been deployed and/or initially configured. For example, the allocation of the sub-bands 210 may be modified in response to changing demand for the resources of the femtocells and/or other wireless access points, changes in the licensing agreement that indicates the number of sub-bands 210 that are allocated to the femtocells and/or the other licensed or unlicensed communication systems, and the like.

Referring back to FIG. 1, the base station 105 and/or the femtocell 110 can transmit a signal to the access terminals 115 to let the access terminals 115 know which subcarriers 205 and/or sub-bands 210 are being used for transmission by the base station 105 and/or the femtocell 110. The signals can also be used to synchronize the access terminals 115 to the base station 105 and/or the femtocell 110. For example, the femtocell 110 may be allocated a first set of sub-bands to support wireless communication over the air interface 125. The femtocell 110 may therefore transmit signals that identify to the access terminals 115(2) which sub-bands have been allocated to the femtocell 110. In one embodiment, the signals are transmitted periodically in the preambles prior to the transmission of OFDM symbols that include the data transmitted from the femtocell 110. The signals can therefore be used to indicate the sub-carriers 205 and/or sub-bands 210 that are going to be used to transmit subsequent data. In various alternative embodiments, the base station 105 may also transmit signals indicating the sub-bands that have been allocated to the base station 105 for communication with the access terminals 115(1). These signals may be transmitted in addition to the signals transmitted by the femtocell 110 or instead of the signals transmitted by the femtocell 110, depending on the circumstances.

The signals transmitted by the base station 105 and/or the femtocell 110 are formed by combining orthogonal or substantially uncorrelated sequences that are assigned to each of the plurality of sub-bands. As used herein, the term "substantially uncorrelated" will be understood to indicate that cross correlations of the substantially uncorrelated sequences generate a cross-correlation signal that is below a selected tolerance. The value of the cross-correlation signal may be positive (indicating correlation of the signals) or negative (indicating anti-correlation of the signals). In one embodiment, each sub-band is associated with a pseudo-random sequence that is orthogonal to or substantially uncorrelated with the pseudo-random sequences assigned to the other sub-bands. For example, the pseudo-random sequences may be band-limited, i.e., the transmitted energy of the pseudo-random sequence is substantially contained within the frequency range corresponding to the sub-band assigned to the pseudo-random sequence. However, persons of ordinary skill in the art having benefit of the present disclosure should appreciate that a small amount of the energy of the time-limited pseudo-random sequence will be transmitted at frequencies outside of the sub-band. A band-limited pseudo-random sequence may be constructed to keep this out-of-band energy below a selected tolerance.

The access terminals 115 can receive the signals including one or more orthogonal or substantially uncorrelated sequences and extract the sequences from the signal using a cross-correlation of the signal with the known sequences and a sliding window timing hypothesis, as will be discussed in detail herein. The access terminals 115 can therefore determine which sub-carriers 205 and/or sub-bands 210 are being used for transmission by identifying the orthogonal or substantially uncorrelated sequences in the transmitted signal. The access terminals 115 can also synchronize to the base station 105 and/or the femtocell 110 using a timing analysis of the received sequences.

Figure 3:
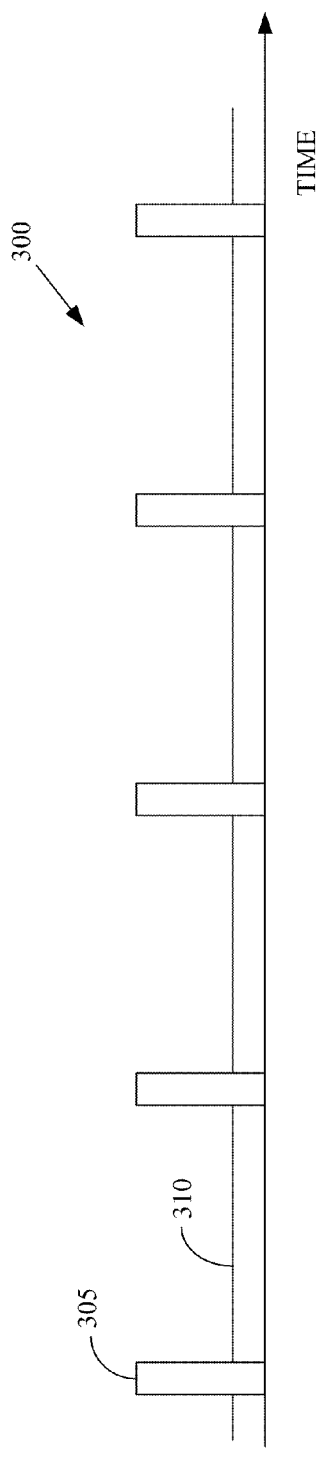
FIG. 3 conceptually illustrates one exemplary embodiment of a transmission sequence that can be used to transmit pseudo-random sequences that identify sub-bands.

FIG. 3 conceptually illustrates one exemplary embodiment of a transmission sequence 300 that can be used to transmit pseudo-random sequences that identify sub-bands. Time increases to the right in FIG. 3. Preambles 305 are indicated by the tall narrow boxes and the OFDM data transmissions 310 are indicated by the short extended boxes. The preambles 305 include the orthogonal or substantially uncorrelated signals indicating the sub-bands that are allocated for the subsequent OFDM data transmissions 310. The information in the preambles 305 can therefore be used by receivers to determine which sub-bands are going to be used for the subsequent OFDM transmissions 310 and to synchronize the receiver to the transmitter, as discussed herein. Moreover, the information in the preambles 305 can be changed dynamically to support dynamic changes in the sub-bands that are used for OFDM data transmissions 310. For example, each of the preambles 305 may indicate a different set of sub-bands that is going to be used for the subsequent OFDM data transmissions 310. The receiver can use the preambles 305 to monitor the allocated sub-bands and to maintain temporal synchronization with the transmitter.

Figure 4:
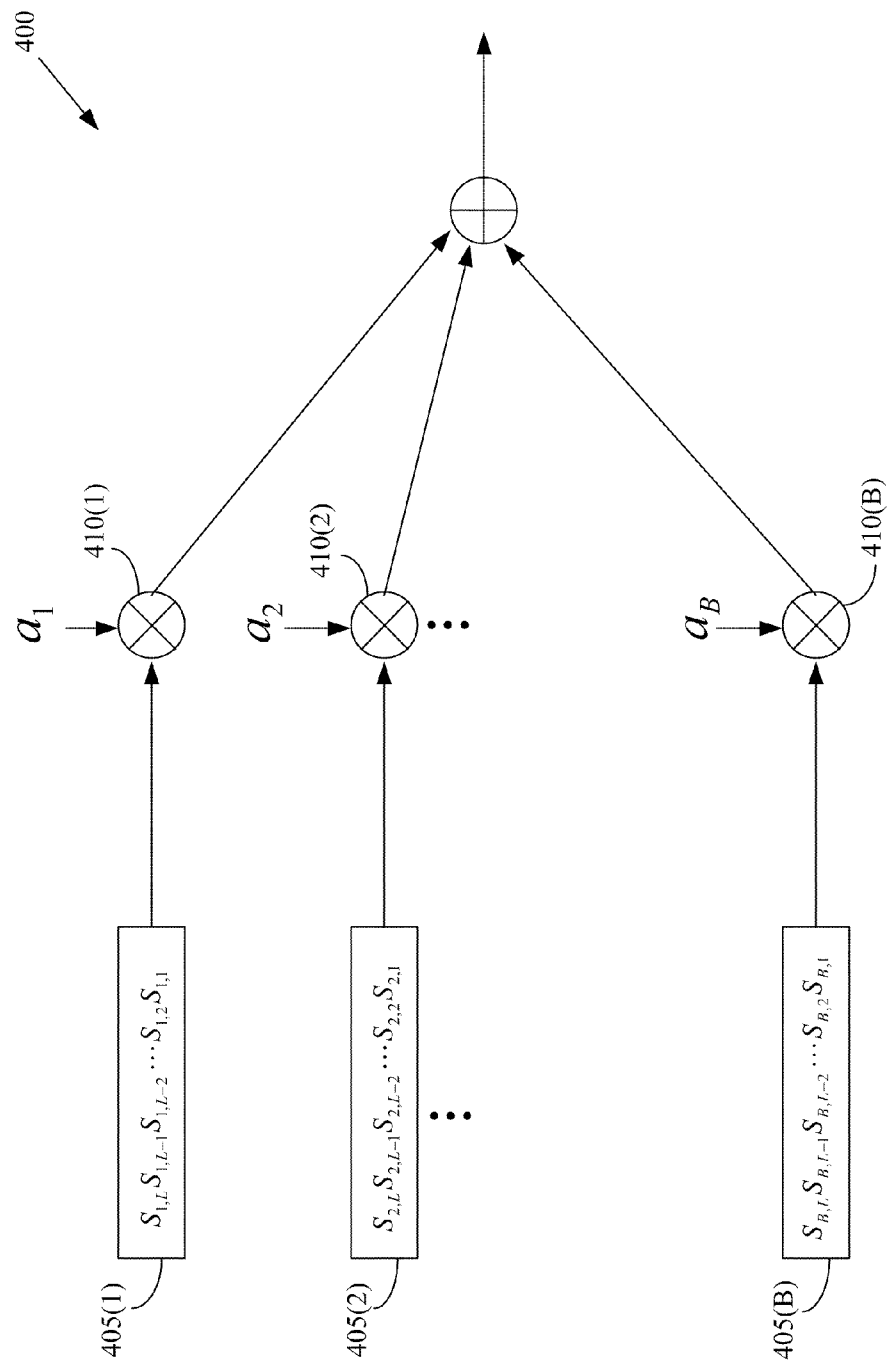
FIG. 4 conceptually illustrates one exemplary embodiment of a generator that can be used to combine preamble sequences to form a transmitted sequence.

FIG. 4 conceptually illustrates one exemplary embodiment of a generator 400 that can be used to combine preamble sequences to form transmitted sequences. In the illustrated embodiment, the generator 400 includes multiple branches associated with different pseudo-random (preamble) sequences 405 that are formed from a plurality of symbols $S_{i,j}$. For example, the generator 400 includes B branches and each branch is associated with a pseudo-random sequence 405 that has a symbol length L. The symbols are typically complex valued symbols that are selected so that the pseudo-random sequences 405 are orthogonal or substantially uncorrelated. Each symbol is fed to a multiplier 410 and multiplied by a control value, $a_j$, which is set to 0 or 1 to indicate whether the corresponding sub-band 210 has been allocated for transmission. A value of 0 indicates that the sub-band 210 has not been allocated for transmission of OFDM data and so the corresponding pseudo-random sequence is not added to the output signal that forms the transmitted sequence. A value of 1 indicates that the sub-band 210 has been allocated for transmission and so the corresponding pseudorandom sequence is added to the output signal and becomes a part of the transmitted sequence. Output signals from the multipliers 410 are provided to an adder 415, which adds the sequences to form an output signal that can be transmitted as part of the preamble.

Figure 5:
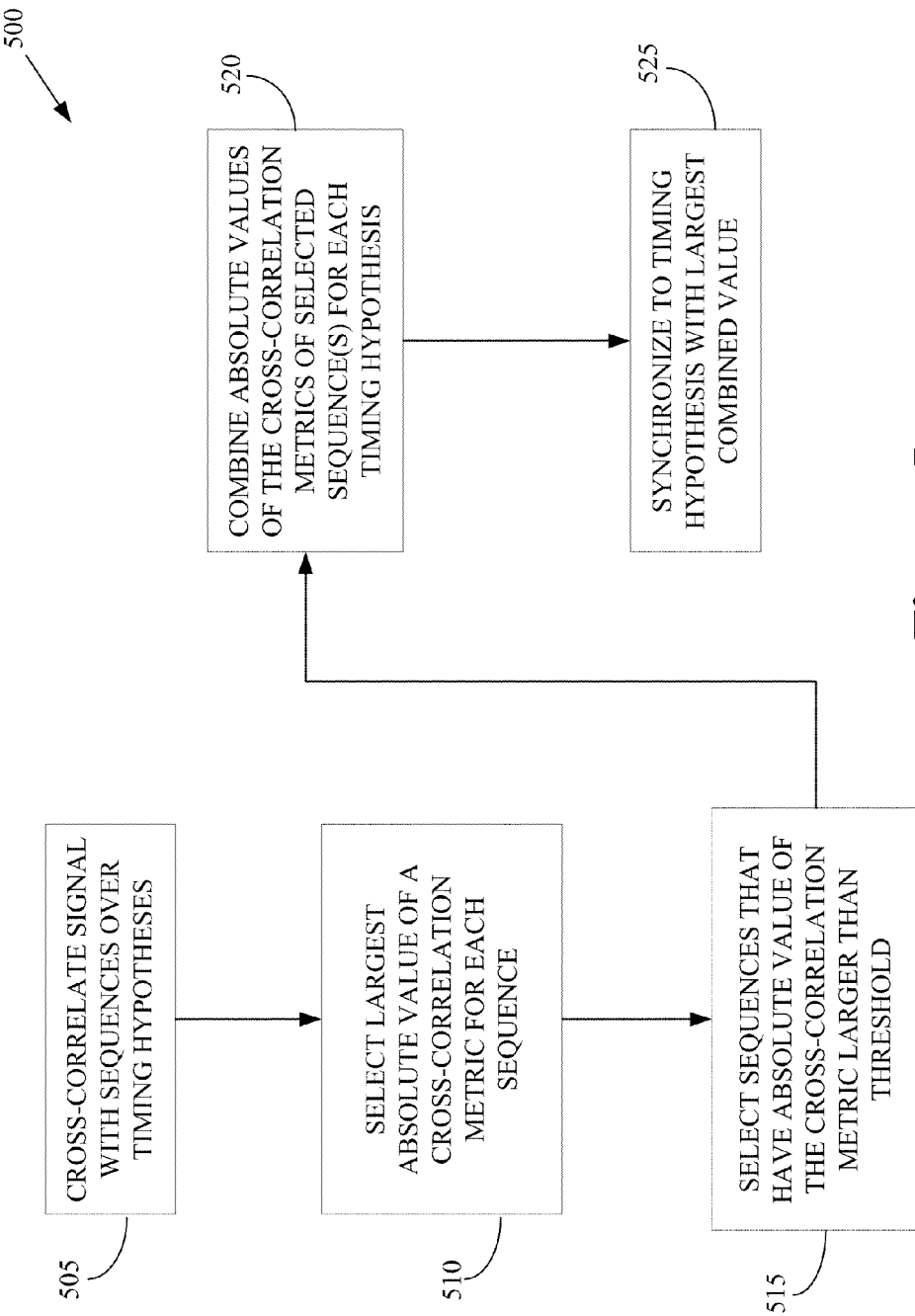
FIG. 5 conceptually illustrates one exemplary embodiment of a method for detecting sequences indicating allocated sub-bands and synchronizing a transmitter and a receiver.

FIG. 5 conceptually illustrates one exemplary embodiment of a method 500 for detecting sequences indicating the allocated sub-bands and synchronizing a transmitter and a receiver. The cross-correlation and/or detection functionality used in the method 500 may be implemented in one or more functional elements deployed in the receiver. In the illustrated embodiment, the receiver monitors signals transmitted over the air interface by a transmitter. The received signals are cross correlated (at 505) with a complete set of potential sequences using a sliding timing window. The range of the timing window corresponds to a set of timing hypotheses, which may cover the entire range of possible transmission timings or may be narrowed if information is available that indicates the actual timing of the signals transmitted by the transmitter. The receiver selects (at 510) the largest absolute value of the cross-correlation metric for each sequence. The cross-correlation metrics for each sequence can then be compared to a threshold. If the absolute value of the cross-correlation metric for any of the sequences exceeds the threshold, indicating that the sequence has been transmitted by the transmitter, then the sequence is selected (at 515). The set of selected sequences indicates the set of sub-bands that may be used by the transmitter for transmitting subsequent OFDM data.

The receiver can then synchronize itself to the transmitter using the detected sequences. In the illustrated embodiment, the receiver combines (at 520) the cross-correlation metrics for each of the selected sequences to create a timing metric for each timing hypothesis. For example, if two sequences have been detected, then the absolute value of the cross-correlation metrics for the two sequences are summed for each timing hypothesis and the sum forms the timing metric for the corresponding timing hypothesis. The timing metrics for each timing hypothesis are compared and the receiver synchronizes (at 525) to the timing hypothesis having the largest value of the timing metric. Although the technique depicted in FIG. 5 performs sequence detection and synchronization as two separate and sequential steps, persons of ordinary skill in the art having benefit of the present disclosure should appreciate that this is not required for the practice of the techniques described herein. For example, the receiver may instead form metrics for combined timing/sequence detection hypotheses so that the sequences can be detected concurrently with synchronizing the transmitter and the receiver.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method for use in a wireless communication system that supports orthogonal frequency division multiplexing (OFDM) of transmissions over a plurality of subcarriers having orthogonal frequencies, comprising:
    allocating, at a network entity, at least one of a plurality of sub-bands for communication with at least one access terminal, each of the plurality of sub-bands comprising at least one of the plurality of subcarriers and being associated with a corresponding one of a plurality of pseudo-random sequences, wherein each pseudo-random sequence comprises at least one symbol;
    generating a signal by combining symbols in the plurality of pseudo-random sequences with a plurality of control values that indicate whether a corresponding sub-band is allocated to said at least one access terminal; and
    transmitting the signal over an air interface, wherein transmitting the signal comprises transmitting at least one of a plurality of orthogonal pseudo-random sequences or pseudo-random sequences that are substantially uncorrelated.

2. The method of claim 1, wherein allocating said at least one of the plurality of sub-bands comprises dynamically allocating said at least one of the plurality of sub-bands to at least one of a licensed communication system and an unlicensed communication band.

3. The method of claim 1, wherein allocating said at least one of the plurality of sub-bands comprises allocating a plurality of non-contiguous sub-bands.

4. The method of claim 1, wherein allocating said at least one of the plurality of sub-bands comprises allocating said at least one of the plurality of sub-bands for transmission of OFDM data.

5. The method of claim 4, wherein transmitting said at least one of the plurality of pseudo-random sequences comprises transmitting said at least one of the plurality of pseudo-random sequences in a time domain preamble prior to transmitting the OFDM data.

6. The method of claim 1, wherein transmitting said at least one of the plurality of pseudo-random sequences comprises transmitting at least one of a plurality of pseudo-random sequences that are substantially band-limited to the sub-band indicated by the pseudo-random sequence.

7. The method of claim 1, wherein transmitting said at least one of the plurality of pseudo-random sequences comprises transmitting more than one of the plurality of pseudo-random sequences to indicate allocation of more than one sub-band.

8. The method of claim 7, wherein transmitting said more than one of the plurality of pseudo-random sequences comprises transmitting a linear combination of said more than one of the plurality of pseudo-random sequences.

9. A method for use in a wireless communication system that supports orthogonal frequency division multiplexing (OFDM) of transmissions over a plurality of subcarriers having orthogonal frequencies, comprising:
    allocating, at a network entity, at least one of a plurality of sub-bands for communication with at least one access terminal, each of the plurality of sub-bands comprising at least one of the plurality of subcarriers and being associated with a corresponding one of a plurality of pseudo-random sequences, wherein each pseudo-random sequence comprises at least one symbol;
    generating a signal by combining symbols in the plurality of pseudo-random sequences with a plurality of control values that indicate whether a corresponding sub-band is allocated to said at least one access terminal; and
    periodically transmitting said at least one of the plurality of pseudo-random sequences over an air interface in time domain preambles prior to time periods allocated for transmission of OFDM data using the allocated sub-bands indicated by said at least one of the plurality of pseudo-random sequences.

10. A method for use in a wireless communication system that supports orthogonal frequency division multiplexing (OFDM) of transmissions over a plurality of subcarriers, comprising:
    allocating, at a network entity, at least one of a plurality of sub-bands for communication with at least one access terminal, each of the plurality of sub-bands comprising at least one of the plurality of subcarriers and being associated with a corresponding one of a plurality of pseudo-random sequences; and
    transmitting, over an air interface, at least one of the plurality of pseudo-random sequences, said at least one transmitted pseudo-random sequence indicating said at least one of the plurality of sub-bands allocated for communication with said at least one access terminal, wherein each of the plurality of pseudo-random sequences indicates a combination of allocated sub-bands.

11. A method for use in a wireless communication system that supports orthogonal frequency division multiplexing (OFDM) of transmissions over a plurality of subcarriers having orthogonal frequencies, comprising:
    receiving, at an access terminal over an air interface with an access point, a signal formed of at least one of a plurality of pseudo-random sequences and at least one of a plurality of control values associated with a plurality of sub-bands, wherein each pseudo-random sequence comprises at least one symbol and each of the plurality of sub-bands comprises at least one of the plurality of subcarriers, and wherein the control values indicate whether the corresponding sub-band is allocated to the access terminal;
    detecting, at the access terminal, said at least one of the plurality of pseudo-random sequences included in the received signal; and
    synchronizing the access terminal to the access point using said at least one of the plurality of pseudo-random sequences and said at least one of a plurality of control values included in the received signal, wherein receiving said at least one of the plurality of pseudo-random sequences comprises receiving at least one of a plurality of orthogonal pseudo-random sequences or pseudo-random sequences that are substantially uncorrelated.

12. The method of claim 11, wherein receiving said at least one of the plurality of pseudo-random sequences comprises receiving at least one of a plurality of pseudo-random sequences that are substantially band-limited to the sub-band indicated by the pseudo-random sequence.

13. The method of claim 11, wherein receiving said at least one of the plurality of pseudo-random sequences comprises receiving a linear combination of more than one of the plurality of pseudo-random sequences that are substantially orthogonal or uncorrelated.

14. A method for use in a wireless communication system that supports orthogonal frequency division multiplexing (OFDM) of transmissions over a plurality of subcarriers, comprising:

receiving, at an access terminal over an air interface with an access point, a signal comprising at least one of a plurality of pseudo-random sequences, said at least one of the plurality of pseudo-random sequences indicating at least one of a plurality of sub-bands, each of the plurality of sub-bands comprising at least one of the plurality of subcarriers;

detecting, at the access terminal, said at least one of the plurality of pseudo-random sequences included in the received signal, wherein detecting said at least one of the plurality of pseudo-random sequences comprises performing, at a correlator in the access terminal, sliding-window cross-correlation of the signal with the plurality of pseudo-random sequences over a range of preamble timing hypotheses; and synchronizing the access terminal to the access point using said at least one of the plurality of pseudo-random sequences included in the received signal.

15. The method of claim 14, wherein detecting said at least one of the plurality of pseudo-random sequences comprises:

identifying the preamble timing hypothesis that has a maximum correlator output energy for each of the plurality of pseudo-random sequences; and comparing the maximum correlator output energies for each of the plurality of pseudo-random sequences to a threshold.

16. The method of claim 15, wherein detecting said at least one of the plurality of pseudo-random sequences comprises detecting said at least one of the plurality of pseudo-random sequences when the maximum correlator output energy for said at least one of the plurality of pseudo-random sequences exceeds the threshold.

17. The method of claim 16, wherein synchronizing the access terminal to the access point comprises:

combining correlator output energies for each preamble timing hypothesis of said at least one of the plurality of pseudo-random sequences that exceeds the threshold; and synchronizing the access terminal to a base station using the preamble timing hypothesis that has the largest combination of correlator output energies.

18. A method for use in a wireless communication system that supports orthogonal frequency division multiplexing (OFDM) of transmissions over a plurality of subcarriers having orthogonal frequencies, comprising:

receiving, at an access terminal over an air interface with an access point, a signal formed of at least one of a plurality of pseudo-random sequences and at least one of a plurality of control values associated with a plurality of sub-bands, wherein each pseudo-random sequence comprises at least one symbol and each of the plurality of sub-bands comprises at least one of the plurality of subcarriers, wherein the control values indicate whether the corresponding sub-band is allocated to the access terminal, and wherein receiving said at least one of the plurality of pseudo-random sequences comprises periodically receiving said at least one of the plurality of pseudo-random sequences in time domain preambles prior to time periods allocated for transmission of OFDM data using the sub-bands indicated by said at least one of the plurality of pseudo-random sequences;

detecting, at the access terminal, said at least one of the plurality of pseudo-random sequences included in the received signal;

synchronizing the access terminal to the access point using said at least one of the plurality of pseudo-random sequences and said at least one of a plurality of control values included in the received signal, and receiving, at the access terminal, OFDM data transmitted from the access point over the sub-bands indicated by said at least one of the plurality of pseudo-random sequences.

19. The method of claim 18, wherein receiving the OFDM data comprises receiving the OFDM data over a plurality of non-contiguous sub-bands indicated by the plurality of pseudo-random sequences.

20. The method of claim 19, comprising decoding the OFDM data using the synchronization determined from said at least one of the plurality of pseudo-random sequences.

* * * * *